United States Patent [19]
Hayashi

[11] Patent Number: 5,260,924
[45] Date of Patent: Nov. 9, 1993

[54] CLEANING CARTRIDGE FOR OPTICAL DISK DRIVE APPARATUS

[75] Inventor: Katsurou Hayashi, Sagamihara, Japan

[73] Assignee: International Business Machines Corporation, Armonk, N.Y.

[21] Appl. No.: 770,384

[22] Filed: Oct. 3, 1991

[30] Foreign Application Priority Data

Oct. 19, 1990 [JP] Japan .................. 2-279504

[51] Int. Cl.⁵ .............. G11B 7/12; G11B 5/41; G11B 23/02
[52] U.S. Cl. .................. 369/71; 369/292
[58] Field of Search ............... 369/71, 72, 75.1, 292; 360/128, 133

[56] References Cited

U.S. PATENT DOCUMENTS

| | | | |
|---|---|---|---|
| 4,817,078 | 3/1989 | Iwata | 369/71 |
| 4,870,636 | 9/1989 | Yamamoto | 369/292 |
| 5,038,336 | 8/1991 | Kitazawa | 369/72 |
| 5,040,160 | 8/1991 | Moriya | 369/72 |
| 5,088,083 | 2/1992 | Olson | 369/71 |
| 5,128,923 | 7/1992 | Hasegawa et al. | 360/128 |
| 5,144,611 | 9/1992 | Engler et al. | 369/71 |

FOREIGN PATENT DOCUMENTS

| | | |
|---|---|---|
| 63-209084 | 2/1987 | Japan . |
| 63-237274 | 3/1987 | Japan . |
| 2-49284 | 8/1988 | Japan . |

*Primary Examiner*—Edward P. Westin
*Assistant Examiner*—S. Allen
*Attorney, Agent, or Firm*—D. A. Shifrin; M. W. Schecter

[57] ABSTRACT

The invention is an optical system cleaner for an optical disk drive in which a cleaning member is attached directly to a shutter or a member corresponding to the shutter to eliminate the need for a mechanism for linking the cleaning member with the shutter. An optical disk drive according to the present invention includes an actuator for projecting an optical beam through an optical system and to a desired position on an optical disk loaded at a reproduction position. The optical disk drive also includes a shutter opening means for opening the shutter of a cassette with a built-in optical disk. The body of the optical system cleaner has a substantially similar shape to said cassette and a moving member attached to the body of said optical system cleaner so as to move freely and driven by said shutter opening means. A cleaning member is attached to said moving member for sweeping out said optical system by merely taking the body of said optical system cleaner in or out of said optical disk drive.

10 Claims, 4 Drawing Sheets

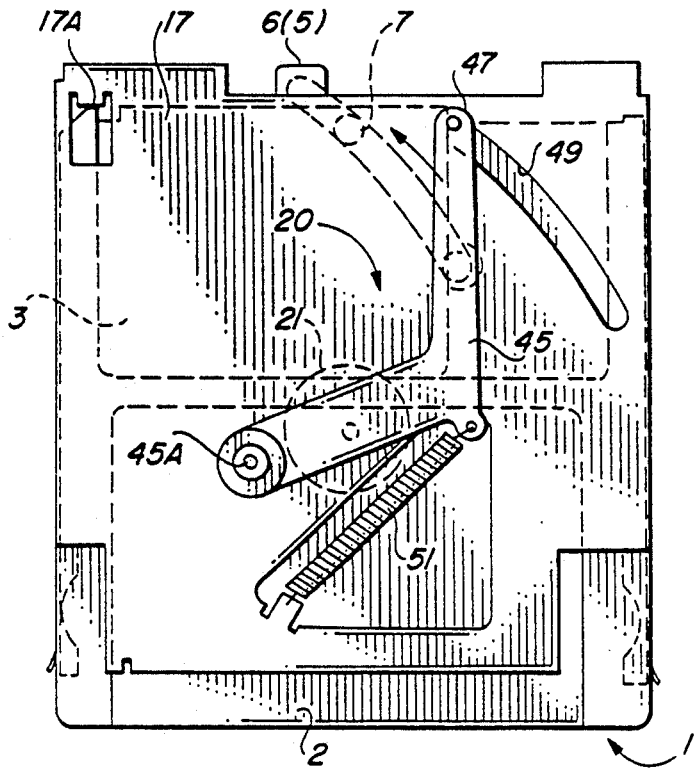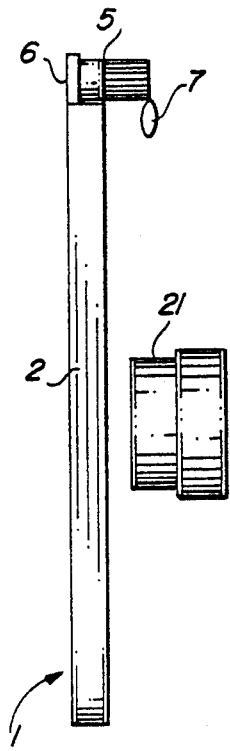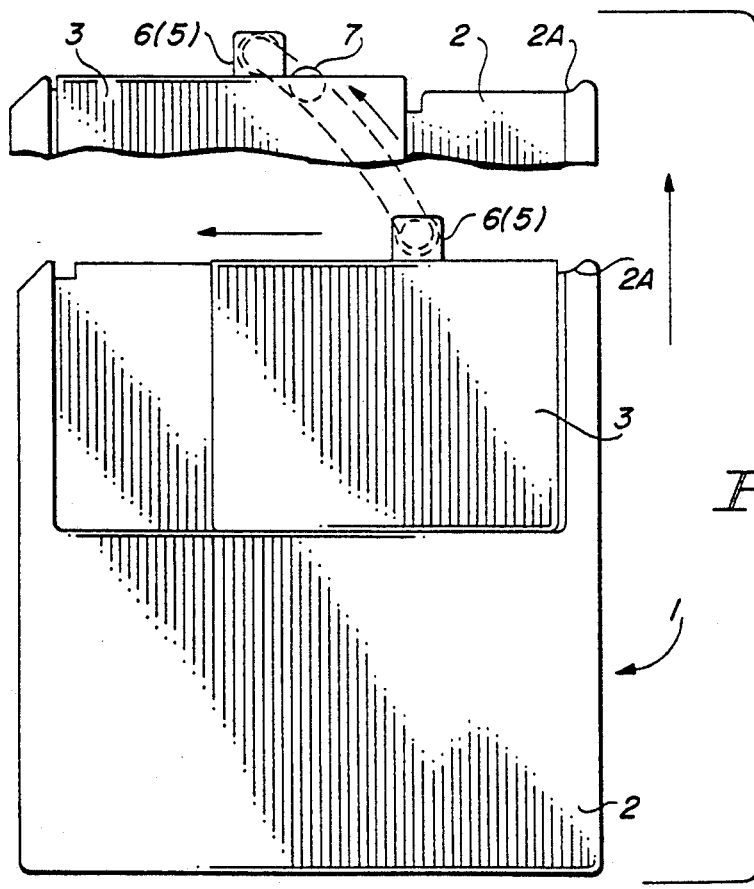

CLEANING CARTRIDGE FOR OPTICAL DISK DRIVE APPARATUS

BACKGROUND OF THE INVENTION

1. Field of the Invention

This invention relates to an optical disk drive and more particularly to an apparatus for cleaning an objective lens, etc. of an actuator (pick-up head) in an optical disk drive.

2. Description of the Related Art

It is well known that a cleaning cartridge can be used as an apparatus for cleaning an objective lens of a pick-up head in an optical disk drive. For example, Japanese Published Unexamined Patent Application (PUPA) No. 63-209084, PUPA 63-237274, and PUPA 2-49284 describe such a cleaning cartridge. However, this kind of cleaning cartridge has a cleaning member such as a brush, etc. built into its body and is constructed so that the cleaning member protrudes from the opening part of the cartridge to sweep out an optical system after the shutter of the cartridge is opened or in the process of its opening. Therefore, this kind of cartridge needs, for example, a link mechanism for linking the cleaning member with the movement of the shutter and thus has a complex construction.

SUMMARY OF THE INVENTION

In view of the foregoing, it is the principle object of the present invention to provide a cleaner for an optical disk drive, and an optical disk drive compatible therewith, which are simple in construction and easy to use.

This and other objects are accomplished by an optical system cleaner for an optical disk drive in which a cleaning member is attached directly to a shutter or a member (moving member) corresponding to the shutter to eliminate the need for a mechanism for linking the cleaning member with the shutter.

An optical disk drive according to the present invention includes an actuator for projecting an optical beam through an optical system and to a desired position on an optical disk loaded at a reproduction position. The optical disk drive also includes a shutter opening means for opening the shutter of a cassette with a built-in optical disk. The body of the optical system cleaner has a substantially similar shape to said cassette and a moving member attached to the body of said optical system cleaner so as to move freely and driven by said shutter opening means. A cleaning member is attached to said moving member for sweeping out said optical system by merely taking the body of said optical system cleaner in or out of said optical disk drive.

The foregoing and other objects, features and advantages of the invention will be apparent from the following more particular description of preferred embodiments of the invention, as illustrated in the accompanying drawing.

BRIEF DESCRIPTION OF THE DRAWING

FIG. 4 is a plan view showing the cleaner of said embodiment inserted into the upper bracket at its deepest position.

FIG. 5 is a side view of FIG. 4.

FIG. 6 is a plan view showing the operations of the cleaner of said embodiment.

DESCRIPTION OF THE PREFERRED EMBODIMENT

Figure 1:
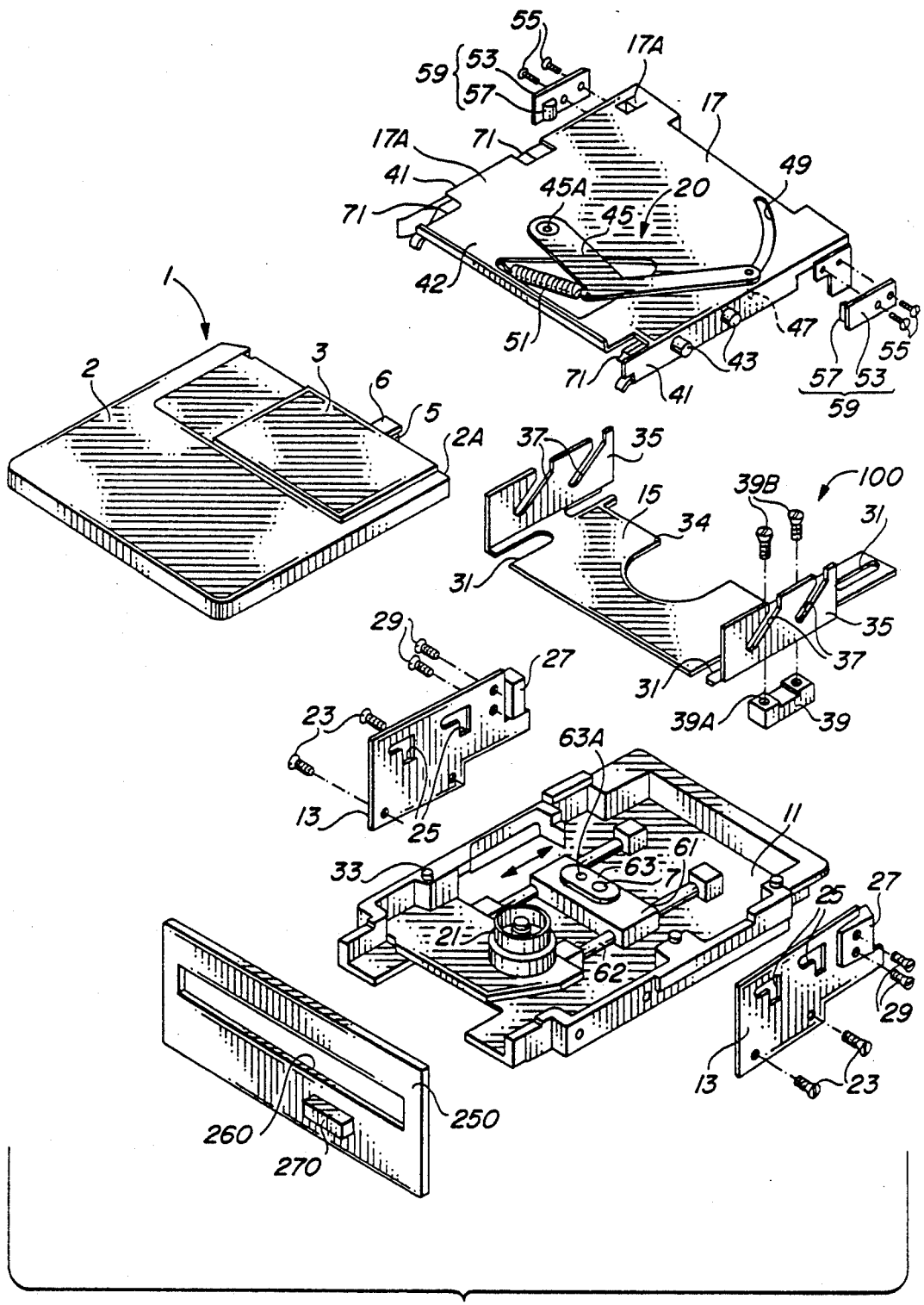
FIG. 1 is an exploded perspective view showing an embodiment of an optical disk drive constructed in accordance with the present invention.
Figure 2:
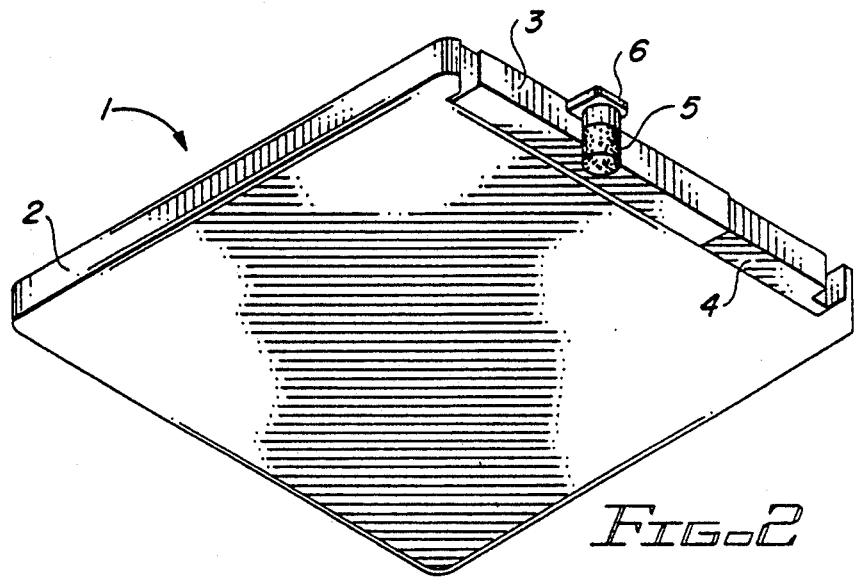
FIG. 2 is a perspective view showing the cleaner of said embodiment observed from a different angle.

FIG. 1 shows an embodiment of an optical disk drive according to the present invention. FIG. 2 is a perspective view of an optical system cleaner 1 at an angle different from FIG. 1.

Referring to FIG. 1 and FIG. 2, the body 2 of optical system cleaner 1 is shaped into a square-like plate of predetermined thickness and has a shape substantially similar to a conventional optical disk cartridge (body). A moving member 3 is attached to the body 2 so that it can be moved freely. The moving member 3 is similar to a shutter of a conventional optical disk cartridge. For example, as shown in FIG. 2, the tip of the moving member 3 is folded toward the body 2 with the bottom surface inside. In the body 2, a guide slot 4 is made so that the folded part of the moving member 3 can slide freely along the slot. The moving member 3 is attached on the right side, as shown in FIG. 1, by tensioning means (not shown), in the same manner as in a conventional shutter.

A brush 5 as a cleaning member is fixed through a mounting member 6 to the tip of the moving member 3. When optical system cleaner 1 is inserted into the optical disk drive, moving member 3 is driven by shutter opening means 20 and moves right and left on the front end of body 2 while brush 5 sweeps out an objective lens 7 of an optical system. Also, when optical system cleaner 1 is removed from the optical disk drive, brush 5 sweeps out the optical system. In FIG. 1, loading means 100 comprises a pair of guide plates 13, a slider bracket 15, and an upper bracket 17 fixed to a base 11. The base 11 is a nearly square tray, with slightly raised edges, whose longitudinal axis is in the direction of insertion of, for example, optical system cleaner 1 (or an optical disk cartridge). A disk driving motor 21, such as a spindle motor, etc. is mounted on the bottom surface of base 11.

On each of the outsides of both side walls of base 11, a guide plate 13 is fixed by screws 23. Guide plates 13 are parallel to each other and are fixed perpendicular to the bottom surface of base 11. In each guide plate 13, two reversed L-shaped slots 25 are arranged horizontally at a predetermined distance. Moreover, at a rear end of the guide plate 13, a latch releasing block 27 is fixed by screws 29. Between the guide plates 13, a slider bracket 15 is arranged. The slider bracket 15 is supported so that it can slide on the upper surface of base 11. In the bottom surface 34 of slider bracket 15, multiple long and slender holes 31 are made and, on the other hand, from the upper surface of the base 11, multiple guide bosses 33 which penetrate the long and slender holes 31, protrude. The holes 31 are elongated in the direction of insertion of the optical system cleaner 1 (or an optical disk cartridge). Slider bracket 15 is guided by guide bosses 33 so that it can slide in said direction of insertion. Slider bracket 15 includes raised sections 35, which are parallel to guide plates 13 and arranged along the insides of the guide plates 13.

In each raised section 35, multiple oblique slots 37 are made. The oblique slots 37 are inclined slightly upwards from the front (at insert slot 260) of the optical disk drive to the rear in the direction of insertion. To the bottom surface 34 of the slider bracket 15, a rack body 39 is fixed by screws 39B at predetermined positions. On the rear side of rack body 39, as shown in the figure, a rack gear 39A is formed. The rack gear 39A engages with a pinion of driving means (not shown) and thus the slider bracket 15 moves forward and backward by means of said driving means.

The upper bracket 17 is formed into a nearly square plate and its sides are folded downward with the surfaces outside in a reverse C shape. The reverse C-shaped sections 41 of said sides face each other and hold the optical system cleaner 1 (or optical disk cartridge) on the bottom surface of upper bracket 17. From the outside surface of the reverse C-shaped section, pins 43 protrude and penetrate both the oblique slots 37 and the reversed L-shaped slots 25. Therefore, if the slider bracket 15 slides forward and backward, the upper bracket 17 moves accordingly in a reverse L-path along the reverse L-shaped slot 25.

The upper bracket 17 is provided with a shutter opening means 20. The shutter opening means 20 is provided with a shutter driving arm 45, which is attached, through a supporting shaft 45A, to a flat section 42 of upper bracket 17 so that it can turn. At the turning end of shutter driving arm 45, a shutter driving pin 47 protrudes downward and moves in an arc-shaped slot 49 where it protrudes downward from the arc-shaped slot 49 in the flat section 42 as the shutter driving arm 45 turns. The shutter driving arm 45 is attached so that its turning end pushes and removes the optical system cleaner 1 (or an optical disk cartridge), by means of a spring 51, from the insert slot 260. If the cleaner 1 is inserted into the upper bracket 17 (reverse C-shaped sections), the shutter driving pin 47 contacts the tip (rightmost part in the figure) of the moving member 3 of the cleaner 1 at a predetermined depth of insertion. In the front end (rightmost part in the figure) of the body 2, a hollow section 2A is formed to ensure that the pin 47 contacts the moving member 3 to move the moving member 3. Hollow section 2A is also made in a conventional optical disk cartridge.

As the depth of insertion of the cleaner 1 into the slider bracket 17 becomes greater, the moving member 3 slides left in the figure by means of the shutter driving pin 47. As cleaner 1 is inserted into the innermost part, the front end of body 2 contacts a stopper 17A of slider bracket 17 and the moving member 3 reaches the leftmost position in the figure at the front end of the body 2. In the case of a conventional disk cartridge, as the depth of its insertion into the slider bracket 17 becomes greater, the cartridge contacts a micro switch (not shown) provided for the slider bracket 17 and the loading means 100 is operated to load the cartridge to a reproduction position. However, in the case of the cleaner 1, it is desirable that body 2 does not cause said micro switch to be operated. To do this, it is necessary that a width of the moving member 3 (a length of the moving member 3 in the direction of sliding it) is greater than that of the shutter of the conventional disk cartridge. If the width of the moving member is greater than that of the shutter, a range within which the shutter driving arm 45 turns are reduced, and arm 45 becomes an obstacle to the body 2 so that body 2 cannot be inserted to a position at which body 2 contacts said micro switch.

Each of the reverse C-shaped sections 41 of upper bracket 17 is provided with latch spring 53 fixed by screws 55 at predetermined positions of its furthest end and latch spring 53 has a latch projection 57 formed at its end. The latch spring 53 and the latch projection 57 construct a latch assembly 59 for latching the conventional optical disk cartridge (not shown). A conventional optical disk cartridge has notches formed on both sides toward its front end, and if the optical disk cartridge is inserted at a predetermined depth into the upper bracket 17, the latch projection 57 enters said notch and thus the conventional optical disk cartridge is latched (held), with its shutter opened, by the upper bracket 17.

However, in the body 2 of cleaner 1, a hollow which the latch projection 57 enters, is not formed. Therefore, cleaner 1 is not latched by the upper bracket 17 and thus is worked by the spring 51 in the direction of its ejection if one removes one's hands from cleaner 1 while inserting the cleaner deeply into upper bracket 17. In an embodiment shown later in FIG. 9, a hollow 20A is provided for latch by projection 57.

The flat section 42 of the upper bracket 17 has multiple attached leaf springs 71, which push cleaner 1 (or an optical disk cartridge) held by the reverse C-shaped sections 41 downward so that cleaner 1 does not rattle within upper bracket 17. In a front panel 250, the insert slot 260 from which the cleaner 1 is inserted into upper bracket 17 of the optical disk drive is made. The front panel 250 is provided with an eject button 270. If the eject button 270 is operated, a driving source (not shown) drives the slider bracket 15 to eject (unload) the conventional disk cartridge.

The base 11 is provided with a linear actuator 61 which can move freely, through a rail 62, in the radial direction of the disk. To the linear actuator 61, a rotary actuator 63 is attached through a shaft 63A so that it can rotate freely. The rotary actuator 63 includes an objective lens 7. The rotary actuator 63 and the linear actuator 61 may be called a pickup or the rotary actuator 63 itself may be called a pickup head.

Figure 3:
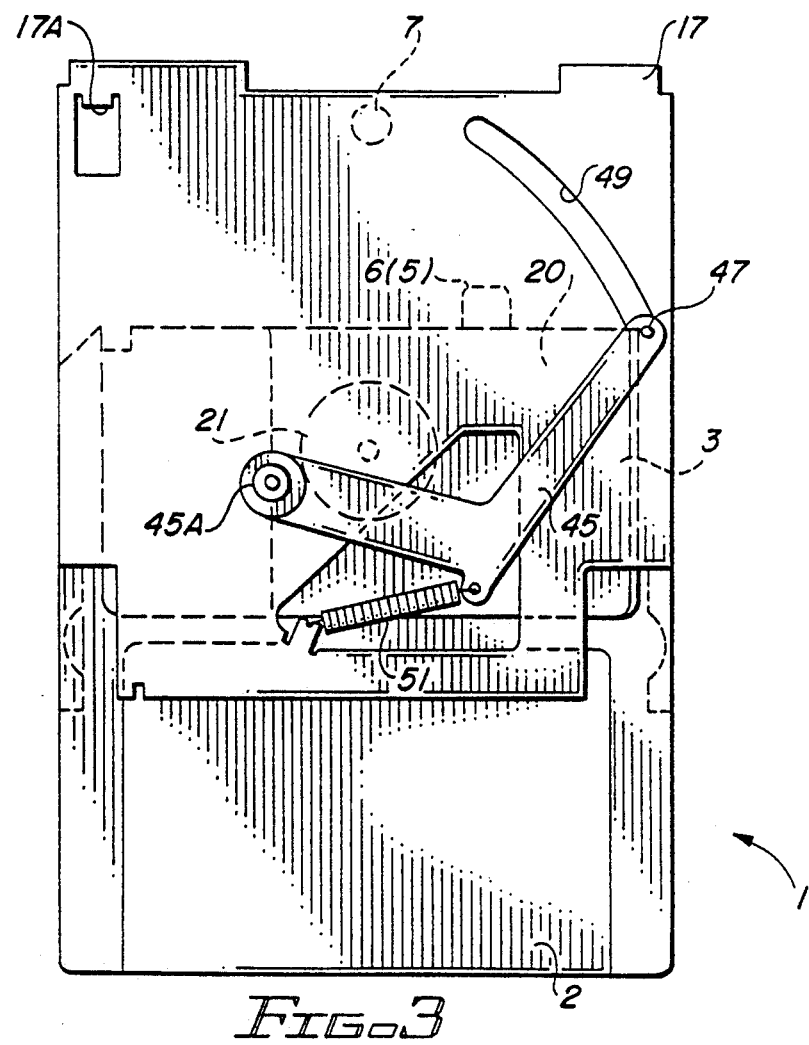
FIG. 3 is a plan view showing the cleaner of said embodiment inserted into the middle of an upper bracket.
Figure 7:
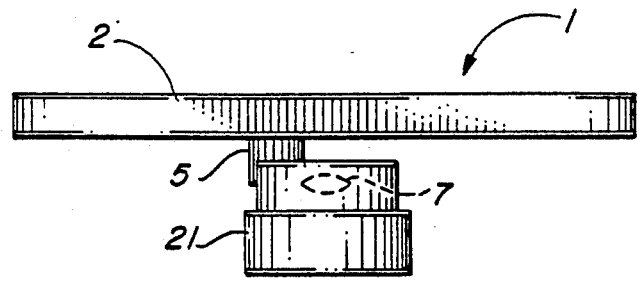
FIG. 7 and FIG. 8 are side views showing the operations in FIG. 6.
Figure 8:
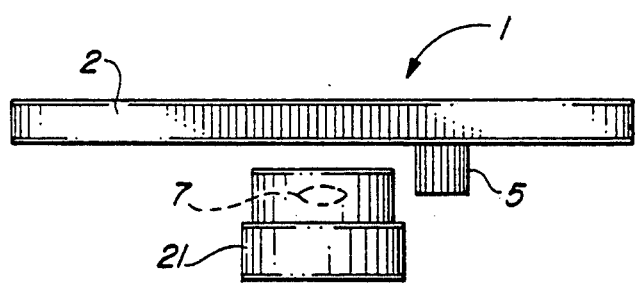

As the cleaner 1 is inserted into insert slot 260 with the optical disk drive turned off, moving member 3 is moved by the shutter opening means 20. While moving member 3 moves, brush 5 sweeps out the optical system, as shown in FIG. 3 to FIG. 5. In this case, brush 5 does not hit motor 21 in the path of its movement. If the cleaner 1 is pushed in the insert slot 260 and then the force applied to cleaner 1 is released, the cleaner 1 is ejected from the insert slot 260 by means of the shutter opening means 20 (spring 51). The ejected cleaner 1 may be pushed in the insert slot 260 again. Each time the cleaner 1 is taken in and out of insert slot 260 by repeating the above operations properly, brush 5 sweeps out the optical system 7. The motion of brush 5 is shown also in FIG. 6 to FIG. 8. FIG. 4 shows cleaner 1 as it is inserted at the deepest position in upper bracket 17. As described above, to avoid loading cleaner 1 to a reproduction position, it is desirable that a width of the moving member 3 becomes greater than a width of a conventional shutter. That is, the stroke of moving member 3 becomes less than that of the conventional shutter, and thus a range within which the shutter driving arm 45 turns is reduced so that the cleaner 1 cannot reach the deepest position of the upper bracket 17.

According to the embodiment, as shown above, brush 5 is not built in the body 2, but is fixed directly to moving member 3 corresponding to the shutter of a conventional disk cartridge so that the optical system cleaner 1 for the optical disk drive, and the optical disk drive itself, may be very simple in construction and easy to use. Further, according to the embodiment, cleaner 1 is not loaded to a disk reproducing position, yet brush 5 sweeps out lens 7. That is, since the optical disk drive is turned off, loading means 100 is not operated, yet lens 7 can be very easily swept out by the brush 5.

Figure 9:
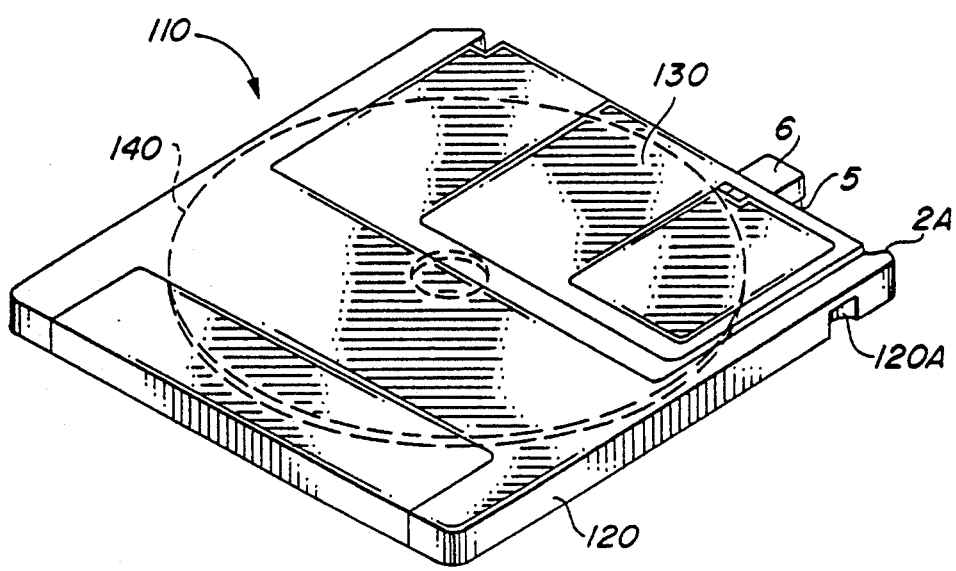
FIG. 9 is a perspective view showing another embodiment.

FIG. 9 shows another embodiment. In the embodiment of FIG. 9, a body 120 of a cleaner 110 has a built-in optical disk 140 and a moving member 130 constructed to function as the conventional shutter. In the body 120, the hollow 120A is made to accept projection 57 (FIG. 1). According to this embodiment, conveniently enough, a lens can be swept out each time cleaner 110 is taken in and out of the optical disk drive for reading from or writing to the optical disk 140.

In said embodiment, a brush has been provided as a cleaning member. However, it will be appreciated that a sponge or air blowing means may be provided as the cleaning member. It will also be appreciated that the cleaning member not only may be attached so that it projects out from the tip of the moving member but also may be fixed to other sections of the moving member, for example, the bottom surface, etc. of the moving member. The shutter opening means may be constructed as shown above, however, it will be appreciated that other means which can open the shutter of the conventional disk cartridge may be provided. Further, in said embodiment, the optical system is not limited to an objective lens, but may include a prism or a lens, etc. other than the objective lens.

While the invention has been particularly shown and described with reference to preferred embodiments thereof, it will be understood by those skilled in the art that various changes in form and details may be made therein without departing from the spirit and scope of the invention. Accordingly, the invention disclosed herein is to be limited only as specified in the following claims.

What is claimed is:

1. An optical system cleaner for an optical disk drive, the optical disk drive suitable for reading an optical disk included in an optical disk cassette when the optical disk cassette is mounted therein, the optical disk cassette including a shutter having a first width, the optical disk drive including a shutter opening means to slide the shutter a first stroke distance and an optical system, the optical system cleaner comprising:
   a body of a shape substantially similar to that of the optical disk cassette and having a front edge for insertion into the optical disk drive;
   an external moving member having a second width greater than the first width driven by the shutter opening means a second stroke distance less than the first stroke distance along a guide slot formed in a portion of the front edge; and
   a cleaning member attached to the moving member for cleaning the optical system as the external moving member is driven along the portion of the front edge when the body is inserted into and removed from the optical disk drive, wherein movement of the external moving member over the second stroke distance prevents the body from activating a loader mechanism in the optical disk drive.

2. The optical system cleaner according to claim 1 wherein the body has a built-in optical disk.

3. The optical system cleaner according to claim 1 wherein the cleaning member is a brush.

4. The optical system cleaner according to claim 1 wherein the cleaning member cleans the objective lens of the optical system.

5. The optical system cleaner according to claim 1 wherein the body does not collide with a disk driving motor of the optical disk drive when it is inserted into and removed from the optical disk drive.

6. The optical system cleaner according to claim 5 wherein the body has a built-in optical disk.

7. The optical system cleaner according to claim 5 wherein the cleaning member is a brush.

8. The optical system cleaner according to claim 5 wherein the cleaning member cleans the objective lens of the optical system.

9. An optical disk drive suitable for reading an optical disk included in an optical disk cassette when the optical disk cassette is mounted therein, the optical disk cassette including a shutter having a first width, the optical disk drive comprising:
   an optical system;
   an actuator for projecting an optical beam through the optical system and to a desired position on the optical disk when the optical disk cassette is mounted in the optical disk drive;
   means for opening the shutter of the optical disk cassette a first stroke distance when the optical disk cassette is mounted in the optical disk drive; and
   an optical system cleaner including:
   a body of a substantially similar shape to the optical disk cassette and having a front edge for insertion into the optical disk drive;
   an external moving member having a second width greater than the first width driven by the means for opening the shutter a second stroke distance less than the first stroke distance along a guide slot formed in a portion of the front edge; and
   a cleaning member attached to the moving member for cleaning the optical system as the external moving member is driven along the portion of the front edge when the body is inserted into and removed from the optical disk drive, wherein movement of the external moving member over the second stroke distance prevents the body from activating a loader mechanism in the optical disk drive.

10. The optical disk drive of claim 9 wherein the body does not collide with a disk driving motor of the optical disk drive when it is inserted into and removed from the optical disk drive.

* * * * *